United States Patent [19]
Irwin

[11] Patent Number: 5,899,978
[45] Date of Patent: May 4, 1999

[54] TITLING SYSTEM AND METHOD THEREFOR

[75] Inventor: Thomas D. Irwin, Phoenix, Ariz.

[73] Assignee: Title America, Phoenix, Ariz.

[21] Appl. No.: 08/726,668

[22] Filed: Oct. 7, 1996

[51] Int. Cl.$^6$ .............................. G06F 15/00; G06F 15/21
[52] U.S. Cl. .................................. 705/1; 705/28; 705/29; 707/531; 707/540; 364/479; 364/479.03; 364/479.05
[58] Field of Search .................................... 705/28, 29, 1; 235/380; 364/479.03, 479.05, 479; 707/3, 531, 540; 345/202

[56] References Cited

U.S. PATENT DOCUMENTS

| | | | |
|---|---|---|---|
| 4,989,144 | 1/1991 | Barnett, III | 705/29 |
| 5,043,891 | 8/1991 | Goldstein et al. | 707/531 |
| 5,267,155 | 11/1993 | Buchanan et al. | 707/540 |
| 5,349,534 | 9/1994 | Rousseff et al. | 364/479 |
| 5,369,763 | 11/1994 | Biles | 707/3 |
| 5,459,304 | 10/1995 | Eisenmann | 235/380 |
| 5,521,815 | 5/1996 | Rose, Jr. | 705/28 |
| 5,623,403 | 4/1997 | Highbloom | 705/28 |
| 5,724,070 | 3/1998 | Denninghoff et al. | 345/202 |
| 5,737,710 | 4/1998 | Anthonyson | 701/1 |

OTHER PUBLICATIONS

To Business Editor: Polaroid Wins Colorado Drivers License Contract with Instant Digital System, Cambridge, Mass, PrRNewswire, Jan. 20, 1994.

More Phones, New Computer May Cut DMV Waiting Time. Los Angeles Times(IT), Sunday, Mar. 24, 1984.

*Primary Examiner*—Allen R. MacDonald
*Assistant Examiner*—M. Irshadullah
*Attorney, Agent, or Firm*—Snell & Wilmer L.L.P.

[57] ABSTRACT

A titling system processes titlework for a plurality of vehicles subject to jurisdiction-specific document requirements. The system receives data that identifies a number of vehicles and indicates specific jurisdictions in which titlework for each vehicle is to be filed. The system includes a database of electronic documents that represent form documents conforming to the requirements of the different jurisdictions. The database is accessed and the system processes the appropriate electronic documents to create the corresponding titlework documents.

26 Claims, 6 Drawing Sheets

TITLING SYSTEM AND METHOD THEREFOR

FIELD OF THE INVENTION

The present invention relates generally to systems for processing titles, licenses, and other documents related to products and services. More specifically, the present invention relates to a centralized system for processing titles for a plurality of vehicles subject to different jurisdiction-specific requirements.

BACKGROUND OF THE INVENTION

State or other jurisdictional regulations often require that certain products or service providers be registered, licensed, titled, or certified in accordance with specific requirements. For example, purchasers of firearms and vehicles are usually required to file appropriate title documents or registration papers with a state agency or licensing bureau. Although burdensome at times, the processing of titling, registration, or licensing documents, and the associated payment of fees, may be inherent in the purchase of certain items.

Titling and registration procedures are typically carried out on an individual basis, i.e., the titlework to a specific vehicle is conventionally processed to completion at the time of sale or shortly thereafter. Although this methodology may be acceptable for a small number of vehicles, it is particularly cumbersome when a large number of vehicles require immediate titling or registration. For example, a nationwide rental car company may purchase thousands of new vehicles each year that require titling and registration in any number of different states or other jurisdictions. Taxi companies, delivery companies, and other businesses may also have the need to purchase and register a large fleet of vehicles in a short period of time.

A number of problems inherent in an individual titling system are exacerbated when the system is overloaded with an abnormally large amount of titlework processing requests. For example, the manual input of data for each vehicle is a time consuming process that can cause a bottleneck in the flow of titlework. Typically, the system operator must have access to the original titles or ownership papers before processing the necessary registration, licensing, or titling paperwork. Consequently, the physical handling of large volumes of paperwork may result in the loss of important documentation, especially when each transaction is individually processed. Unfortunately, conventional titling methodologies do not implement adequate security measures or document tracking features.

In addition, the specific type and amount of titling, registration, and other data can vary drastically from jurisdiction to jurisdiction, and the actual forms utilized for such purposes are typically not standardized. Accordingly, a purchaser of a large fleet of vehicles must be familiar with the various state requirements and must have a supply of the various state forms. Furthermore, individual titlework processing requires the purchaser to provide associated fee payments for each vehicle registered in a particular state. Such individual payments are inconvenient to issue, reconcile, and account for, especially when such payments are distributed to multiple jurisdictions.

SUMMARY OF THE INVENTION

Accordingly, it is an advantage of the present invention that an improved titling system is provided.

Another advantage of the present invention is that the titling system can efficiently process titlework, registrations, licenses, and other documentation related to a large number of products or service providers subject to different jurisdictional requirements.

A further advantage of the present invention is that it provides a titling system that includes security measures and document tracking features.

Another advantage is that the titling system is capable of receiving electronic data records from a remote source independent of the associated documentation.

A further advantage of the present invention is that a titling system is provided that automatically selects appropriate jurisdiction-specific documents for titlework processing.

Another advantage is that the present invention provides a titling system capable of batch processing a large number of documents and fee payments associated with a common jurisdiction.

The above and other advantages of the present invention are carried out in one form by a system for transferring title for an article subject to jurisdiction-specific titling requirements. The system includes a central computer system having a database configured to store a plurality of electronic documents configured in accordance with jurisdiction-specific forms utilized in a plurality of jurisdictions, a memory element capable of storing data identifying the article, and a processor in communication with the database and with the memory element. The processor is configured to process one of the electronic documents in response to the data. The system also includes an output device compatible with the central computer system. The output device is configured to generate a jurisdiction-specific form document containing at least a portion of the data, and the jurisdiction-specific form document is derived from the processed electronic document.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENT

Figure 1:
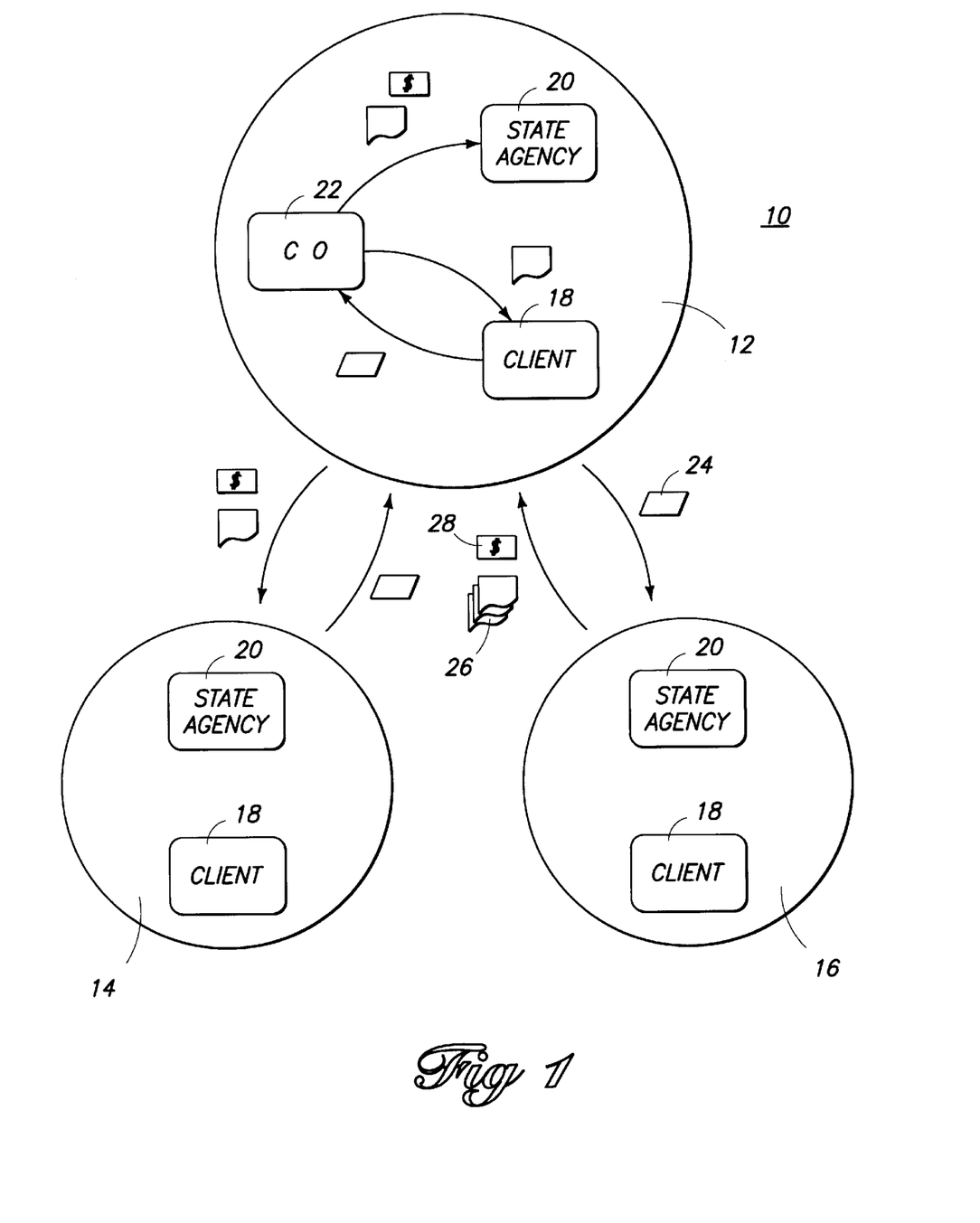
FIG. 1 is a schematic representation of an exemplary environment in which the present invention may operate.

FIG. 1 illustrates an exemplary environment in which a vehicle titling system 10 may operate. System 10 is preferably adapted to facilitate efficient processing and transferring of titlework associated with the purchase of a large number of vehicles. For purposes of this description, "titlework" refers to documentation associated with the purchase, registration, licensing, financing, titling, or other transactions related to the purchase of vehicles. Although system 10 is preferably configured to process vehicle titlework, system 10 may be conveniently configured to process documentation for any article or entity subject to jurisdiction-specific requirements. For example, system 10 may be configured to process titlework related to a variety of products, service providers, or the like. Furthermore, in the context of this specification, the content of a "title" document need not be limited in any manner. For example, a vehicle "title" may include ownership information, registration data, or a description of the vehicle.

System 10 is capable of centrally processing titlework for a number of vehicles that may require titling, registration, or licensing in a number of different jurisdictions. Such versatility is desirable where individual jurisdictions (i.e., local municipalities, counties, states, or nations) set forth specific titlework requirements. For example, the specific content of a title application may vary from state to state. In addition, individual states may mandate that specific form documents be used for titlework purposes. Accordingly, system 10 is adapted to generate form documents in compliance with the various state requirements.

FIG. 1 depicts a number of states 12, 14, 16, each of which may have specific requirements for the filing of titlework. System 10 is capable of supporting any number of clients 18 that may be located within states 12, 14, 16. In the context of the present invention, a "client" may be any entity that desires to have titlework processed for one or more vehicles. For example, client 18 may be a private individual, a corporate entity, or a government entity. A state agency 20 may be responsible for receiving, filing, and maintaining form documents processed by system 10. For example, a typical jurisdiction includes a motor vehicle department that handles vehicle registration and licensing matters.

System 10 includes a central office 22 located in, e.g., state 12. Although not shown, system 10 may also include additional offices and/or operating elements within or outside of state 12. Central office 22 locates various operating components of system 10 (described below) that may require operator interaction and/or maintenance. In the preferred embodiment, central office 22 interacts with other jurisdictions, such as states 14 and 16, to facilitate the remote processing of titlework.

According to a preferred aspect of system 10, any given client 18 may provide identifying data 24 describing a number of vehicles to central office 22. After receipt of data 24, system 10 generates a number of jurisdiction-specific form documents 26. As noted above, form documents 26 may include, but are not limited to, title/ownership certificates, registration documents, financing disclosures, or operator licenses. In addition to form documents 26, system 10 preferably generates at least one reconciliation document 28 reflecting the payment of fees associated with the filing of form documents 26. These processes are more fully described below.

As indicated in FIG. 1, central office 22 is capable of processing titlework internal to state 12. In addition, form documents 26 may be routed from central office 22 directly to state agency 20 or to client 18 (as depicted within state 12). It should be appreciated that FIG. 1 is merely intended to provide an operational overview of system 10 and that the specific configuration of system 10, the number of jurisdictions with which system 10 may interact, and the actual flow paths of data 24 and form documents 26 may vary according to the particular application.

Figure 2:
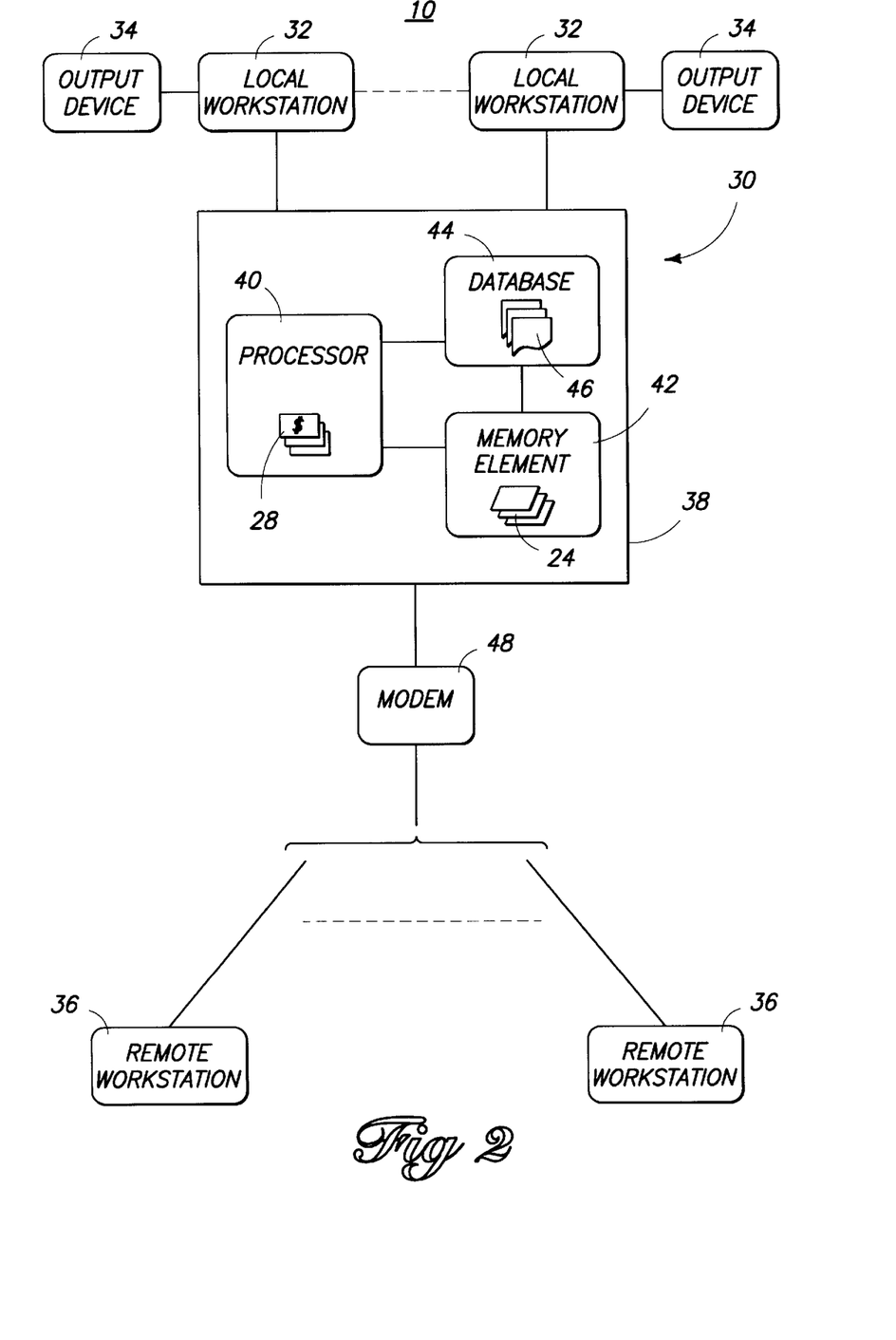
FIG. 2 is a schematic representation of a titling system in accordance with the preferred embodiment of the present invention.

Referring to FIG. 2, a schematic representation of system 10 is depicted. As described above, system 10 is preferably configured to process titlework to transfer titles of vehicles subject to jurisdiction-specific titling requirements. System 10 generally includes a central computer system 30, at least one local workstation 32, at least one output device 34 compatible with central computer system 30, and at least one remote workstation 36 located at a remote location relative central computer system 30. Local and remote workstations 32 and 36 may be configured as conventional personal computers. To facilitate efficient document preparation, each local workstation preferably has an associated output device 34.

Central computer system 30 is preferably arranged as a conventional computer network having a main server 38 configured to support local workstations 32. Central computer system 30 may be arranged in any suitable network topology known to those skilled in the art, e.g., ethernet, token ring, star, or the like. Server 38 locates at least a processor 40, a memory element 42, and a database 44.

Memory element 42 may incorporate conventional RAM or ROM devices, or any suitable electronic data storage device. Memory element 42 may also include non-volatile memory for storing programmed instructions that define the various processes described herein. In addition to performing various data storage functions associated with conventional computing processes, memory element 42 is capable of storing data 24 identifying the subject vehicle or vehicles. The identifying data 24 may be provided to central computer system 30 via local workstations 32 or remote workstations 36.

Identifying data 24 may convey a variety of information relevant to the titlework processed by system 10. For example, identifying data 24 may represent the purchase order number, the vehicle identification number (VIN), the drop ship number (indicating the shipping destination for the vehicle), the charge-to number (indicating the seller of the vehicle), the manufacturer, the model number, the model name, the body style, the body color, the manufacturer's suggested resale price (MSRP), the gross vehicle weight, or the number of cylinders. Identifying data 24 may also include information related to the purchaser of the vehicle. For example, identifying data 24 may represent the purchasers name, address, telephone number, or any applicable financing information. In practice, the amount, configuration, and type of identifying data 24 stored in memory element 42 and processed by central computer system 30 may vary according to the specific application and the content of such identifying data 24 is not limited to that described herein.

Database 44 may reside in a non-volatile portion of memory element 42 or in a memory element (not shown) distinct from memory element 42. Alternatively, database 44 may reside in a portable memory device such as a floppy disc or a CD-ROM (not shown). Database 44 is configured to store a plurality of electronic documents 46 configured in accordance with jurisdiction-specific forms utilized in a plurality of jurisdictions. Electronic documents 46 stored in database 44 preferably represent blank forms or "shells" that are processed with the appropriate data as needed.

Figure 3:
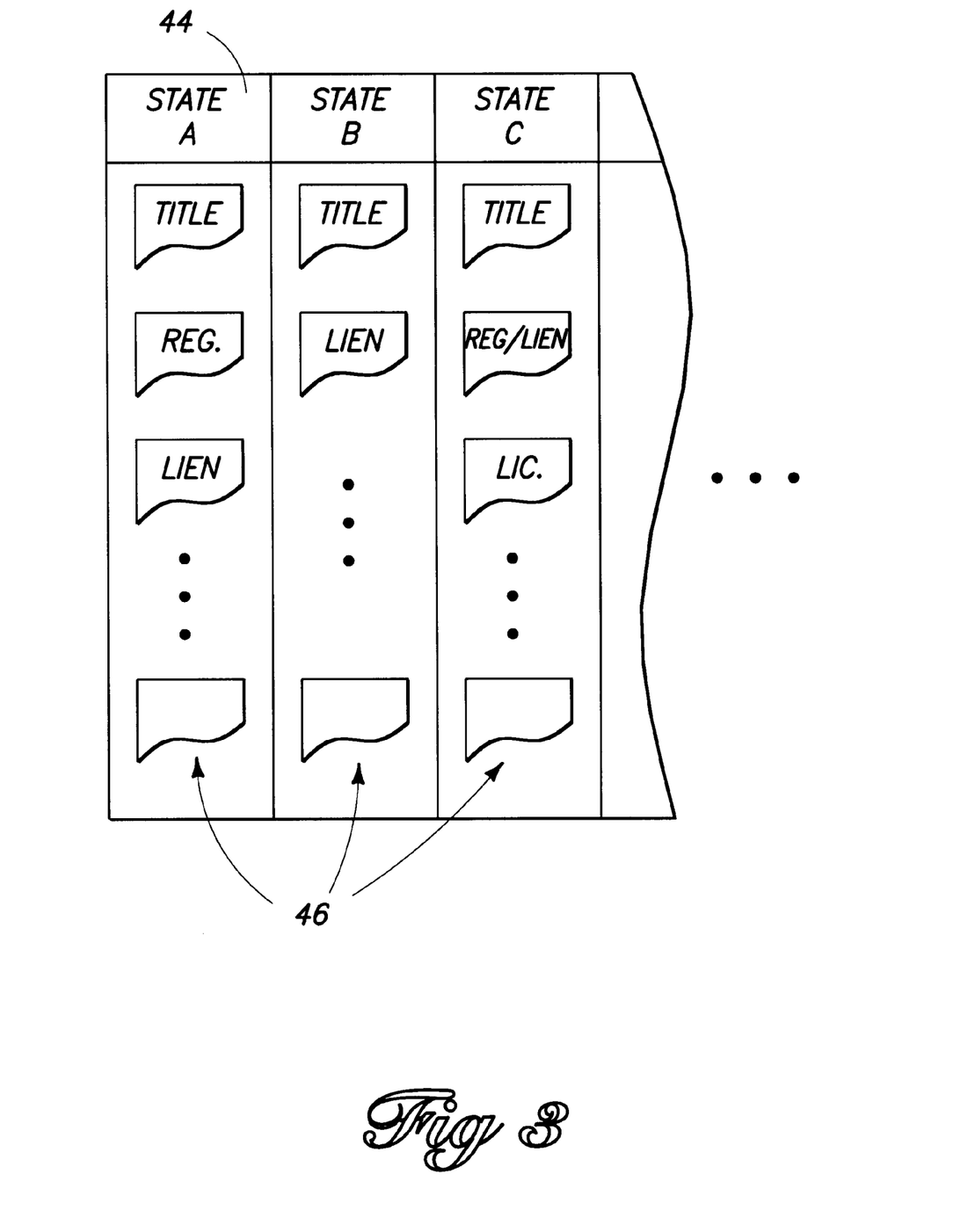
FIG. 3 depicts an electronic document database utilized by the titling system.

FIG. 3 depicts the contents of an exemplary database 44. Each jurisdiction preferably has at least one electronic document 46 associated therewith. As indicated by the ellipses, any number of electronic documents 46 may be associated with any corresponding number of jurisdictions (e.g., states). Although not a requirement of system 10, each jurisdiction may utilize different forms to perform similar transactions. For example, a title application in state A may include more or less information than a title application in state B. State C may employ a vehicle registration document incorporating financing or lien information rather than requiring separate forms for registration and lien information. Furthermore, the physical size of the documents or forms may vary from state to state. Accordingly, system 10 is capable of efficiently handling titlework requests for a variety of jurisdictions.

Referring again to FIG. 2, processor 40 may be realized with any conventional microprocessor device having sufficient processing capabilities to support system 10. Processor 40 is configured to carry out conventional operating processes in addition to the various processes associated with the present invention. Notably, processor 40 communicates with database 44 and with memory element 42 to process electronic documents 46 in response to data 24 received by system 10. According to a preferred aspect of system 10, processor 40 calculates the applicable fees associated with the titlework and produces reconciliation documents 28 for payment of such fees.

Local workstations 32 are preferably configured to access database 44 and, in particular, electronic documents 46. As described above, local workstations 32 are capable of providing data 24 to memory element 42. Consequently, an operator at a local workstation 32 can initiate data entry and process the appropriate titlework for a given vehicle or group of vehicles.

As described briefly above, an output device 34 is preferably associated with each local workstation 32. Output devices 34 are preferably dot-matrix printers suitable for use with carbon copy forms. However, any suitable printer may be employed by system 10. Output device 34 is configured to generate a jurisdiction-specific form document 26 for each processed vehicle. Each form document 26 is derived from an associated electronic document 46. Consequently, each jurisdiction-specific form document 26 contains at least a portion of the identifying data 24 for the subject vehicle.

System 10 may also be configured as a paperless system. For example, form documents 26 may be electronically transferred for electronic storage or display at a suitable display device. Consequently, output devices 34 may be conventional computer display terminals or other visual display devices. In addition, the payment of associated fees may be accomplished by an electronic transfer of funds rather than a conventional cash or check transaction.

Remote workstations 36 communicate with central computer system 30 via a modem 48. Rather than modem 48, system 10 may employ any suitable data communication interface device known to those skilled in the art. Modem 48 receives identifying data 24 from a remote location such as a vehicle manufacturing plant or office, a vehicle sales facility, or client 18 (see FIG. 1). In the preferred embodiment, remote workstations 36 configure identifying data 24 into an ASCII file and download the file to central computer system 30 via modem 48. The downloading of identifying data 24 enables system 10 to begin processing the relevant titlework before receiving the actual paperwork that contains the identifying data 24.

Figure 4:
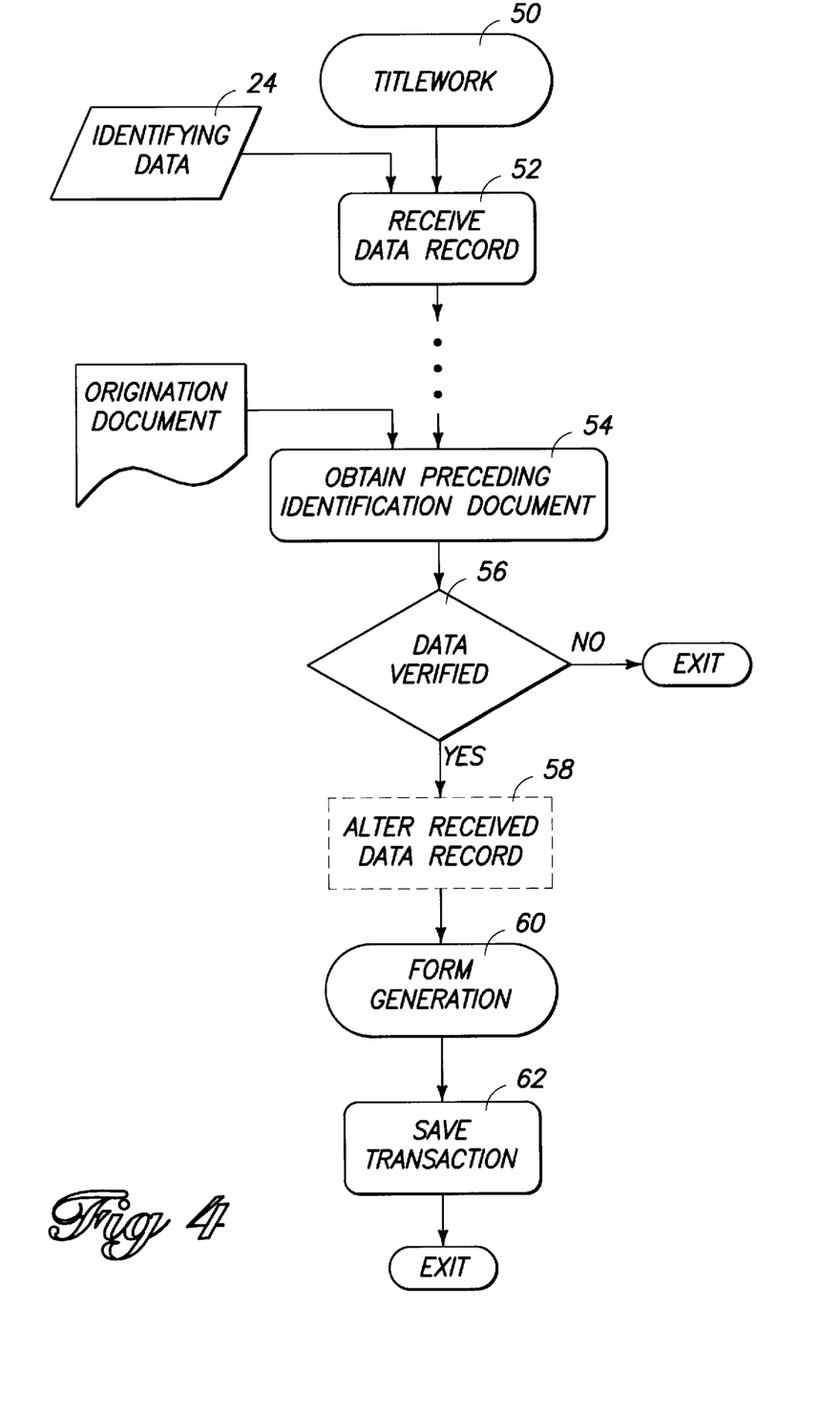
FIG. 4 is a flow diagram of a titlework process performed by the titling system.

FIG. 4 is a flow diagram of a titlework process 50 performed by system 10. As shown and described herein, process 50 is performed for each vehicle processed by system 10. Process 50 begins with a task 52, during which central computer system 30 receives a data record containing identifying data 24 associated with the subject vehicle.

Preferably, the data record is downloaded from remote workstation 36 and task 52 is performed by modem 48 (see FIG. 1). The received data record is preferably routed to memory element 42 where it is stored for subsequent use. In practice, task 52 may receive any number of data records before process 50 continues.

Following task 52, a task 54 obtains an origination document associated with the subject vehicle (depicted in FIG. 4). As indicated by the ellipses, an undefined period of time may pass between tasks 50 and 52. For purposes of this description, an origination document refers to documentation that uniquely identifies the subject vehicle. For example, an origination document may be a manufacturer's certificate of origin (MCO) associated with a new vehicle or a transferred title or registration certificate associated with a previously owned vehicle. It should be appreciated that the origination document may either be a physical document or an electronic representation of a document.

Following task 54, a query task 56 is performed to verify whether the identifying data 24 contained in the data record matches corresponding data contained in the origination document. It should be appreciated that the amount of data 24 downloaded to central computer system 30 may exceed the amount necessary for the processing of the relevant form documents 26. Accordingly, system 10 may be adapted to select the appropriate data 24 from the downloaded data record in response to the particular jurisdiction and the specific form document 26.

Query task 56 may require operator interaction at, e.g., workstation 32. For example, an operator may input the VIN or an order number contained in the origination document to access the associated data record. Alternatively, system 10 may perform query task 56 electronically by employing a digital scanner or other device (not shown) to extract the corresponding data directly from the origination document. Processor 40 may compare the extracted data to the identifying data 24 stored in memory element 42.

If query task 56 fails to verify the corresponding data contained in the origination document, then titlework process 50 exits. If process 50 exits at query task 56, then an operator may be required to perform corrective action before the titlework for the subject vehicle can be completed. For example, an operator may contact the vehicle manufacturer, state agency 20, or client 18 (see FIG. 1) to investigate whether the correct identifying data 24 was downloaded or whether the origination document contains erroneous data.

If, however, query task 56 determines that the corresponding data contained in the origination document matches the identifying data 24 contained in the data record, then an optional task 58 may be performed (described below). Rather than receiving and verifying downloaded data as described in connection with tasks 52 and 56, system 10 may also receive identifying data 24 via direct manual input at, e.g., workstation 32. Such manual input enables an operator to inspect an origination document and perform direct data entry of identifying data 24. During such manual input, system 10 may prompt the operator to input specific portions of identifying data 24 in response to the particular jurisdiction and the particular form document 26 being generated.

During optional task 58, the current data record may be altered by a system operator or by an error detection scheme resident in system 10. For example, system 10 may prompt a user to provide specific titling data required by the particular jurisdiction. Of course, if the current data record is acceptable, then task 58 may be bypassed.

If the current data record is sufficient, then a form generation process 60 is performed by system 10. Process 60 is described in detail below. During process 60, one or more jurisdiction-specific form documents 26 are generated (see FIG. 1). As described above, form documents 26 may include a vehicle title, a registration certificate, or the like.

After completion of process 60, a task 62 is preferably performed to save the current transaction in, e.g., memory element 42. The current transaction may include an electronic version of the form documents 26 generated during process 60, the associated data record, the associated identifying data 24, and other information related to the particular vehicle, purchaser, or titlework. It may be desirable to maintain recent transactions for verification and tracking purposes. For example, a stored transaction may be recalled to verify when the titlework was processed, the amount of fees paid, the state of registration, or other relevant information. Furthermore, the stored transactions may be sorted according to different identifying criteria such as the vehicle make, model, or color.

Each transaction may be stored for an indefinite amount of time or, preferably, for a limited time before being automatically purged from system 10. The deletion of old records and transactions may be desirable to prevent unauthorized access or fraudulent reproduction of titlework documents.

Following task 62, titlework process 50 ends. As described above, process 50 may be repeated for any number of vehicles and any number of form documents 26. Alternatively, process 50 may be modified such that the titlework for any number of vehicles can be processed in a parallel manner.

Figure 5:
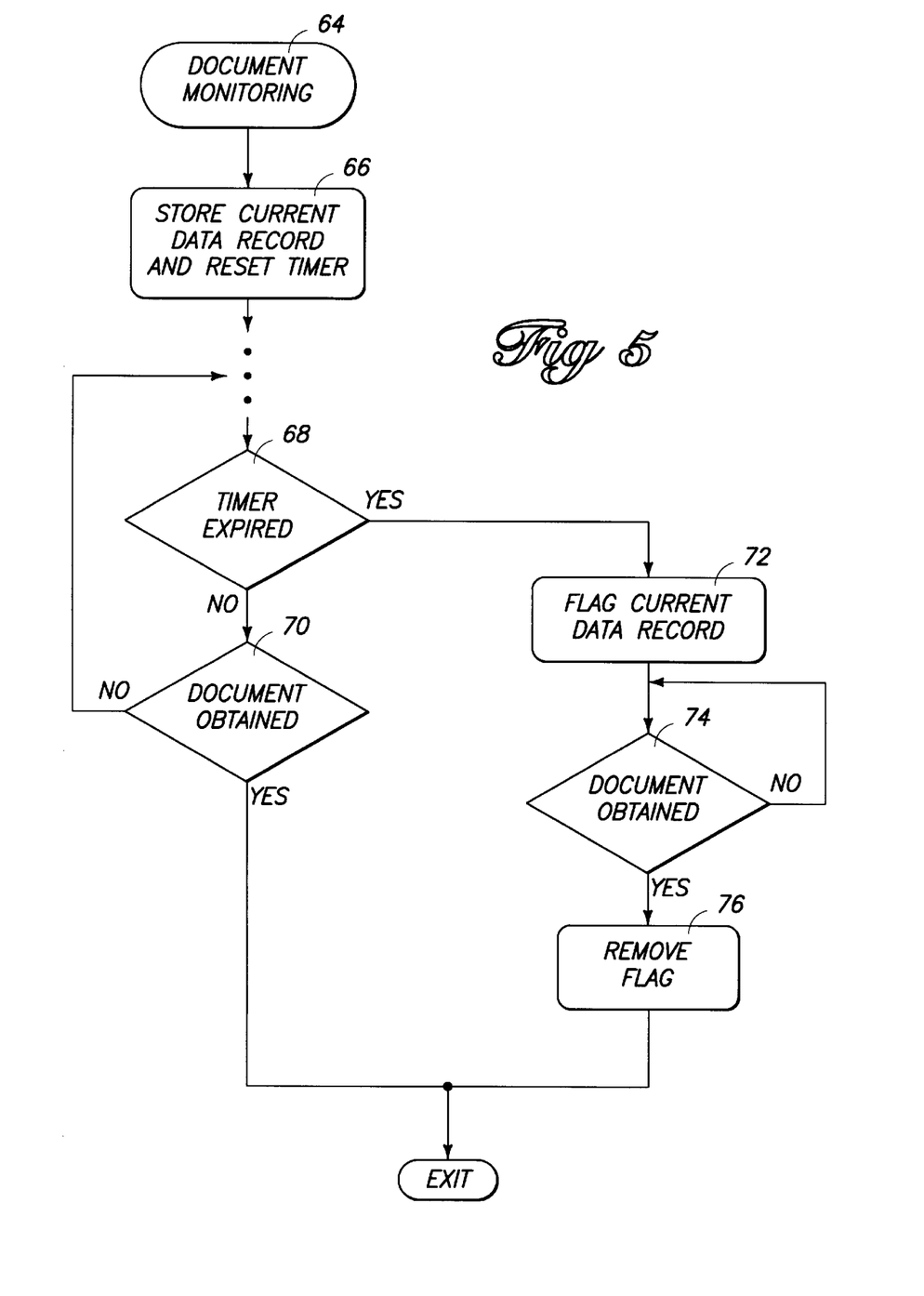
FIG. 5 is a flow diagram of a document monitoring process performed by the titling system.

As described above, system 10 may obtain the origination document some time after the corresponding data record is received (see tasks 52 and 54). According to a preferred aspect of the present invention, system 10 produces a report that indicates nonreceipt of certain origination documents. Referring to FIG. 5, a flow diagram of a document monitoring process 64 is illustrated. Process 64 is preferably performed for each data record downloaded to system 10. Process 64 may be carried out in general by central computer system 30 and specifically by processor 40. It should be noted that process 64 may be carried out concurrently with other processes described herein.

Document monitoring process 64 begins with a task 66, which stores the current data record in central computer system 30 and resets an internal timer. In the preferred embodiment, the internal timer runs for fifteen days before expiring. Of course, the internal timer may be configured to monitor any amount of time. Task 66 may be repeated for any number of data records before process 64 proceeds to a query task 68.

Query task 68 determines whether the internal timer has expired. If the internal timer has not expired, then a query task 70 is initiated. Query task 70 determines whether the origination document corresponding to the current data record has been obtained by system 10. Query task 70 may be responsive to an operator input acknowledging receipt of the origination document or to the commencement of further processing of the subject data record. If the origination document has been obtained within the predetermined time period, then document monitoring process 64 exits. If, however, query task 70 determines that the origination document has not been obtained, then process 64 is reentered at query task 68 to continue monitoring the internal timer.

If query task 68 determines that the internal timer has expired, then a task 72 is performed. Task 72 flags the current data record to indicate that the corresponding origination document has not been obtained within the given time period. In the preferred embodiment, system 10 periodically produces a listing or report of the flagged data records. This feature alerts the system operators of potentially lost documents or erroneously downloaded data records. System 10 may also be configured to automatically generate a form letter, an e-mail message, a facsimile document, or the like in response to a flagged data record.

After the current data record is flagged, a query task 74 tests whether the corresponding origination document has been obtained. Query task 74 may repeat until the corresponding document is obtained. Document monitoring process 64 may include a timeout feature that terminates processing at query task 74 after a predetermined period. If query task 74 determines that the corresponding document has been obtained, then a task 76 may be performed to remove the flag from the subject data record. Following task 76, process 64 exits.

Figure 6:
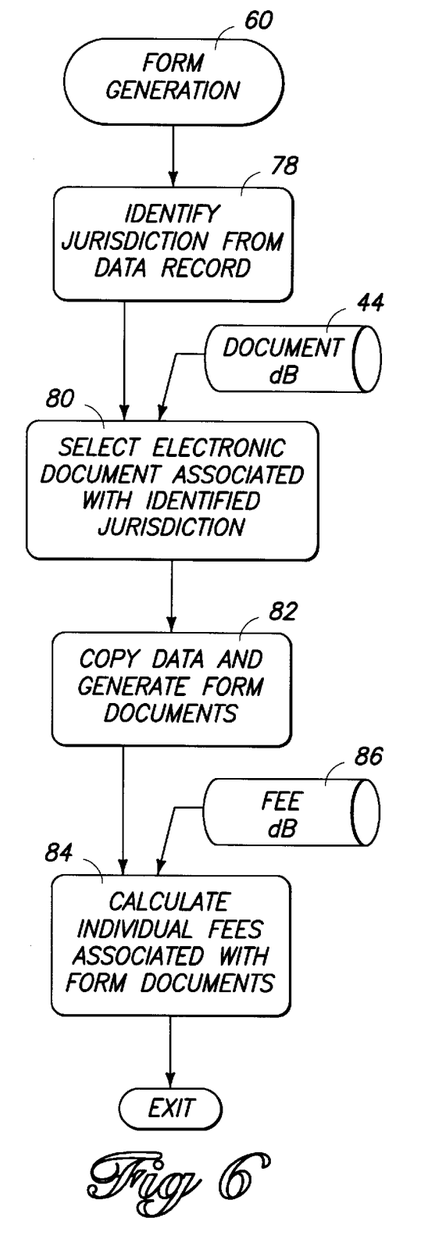
FIG. 6 is a flow diagram of a form generation process performed by the titling system.

FIG. 6 is a flow diagram of form generation process 60, which is carried out by system 10 during titlework process 50 (described above). Process 60 begins with a task 78, which identifies the particular jurisdiction (state, city, county, etc.) from the current data record. In the preferred embodiment, the jurisdiction is indicated by a portion of identifying data 24 (see FIG. 1). The jurisdiction may be indicated by name, by a numeric or textual code, or the like.

Following task 78, a task 80 causes system 10 to select an electronic document associated with the identified jurisdiction. As depicted in FIG. 3, database 44 may include any number of electronic documents for each jurisdiction. Thus, task 80 may be responsive to the selection of a particular class of electronic document, e.g., titles or registration certificates. Task 80 may access database 44 and retrieve a copy of the applicable electronic document for processing.

A task 82 copies at least a portion of identifying data 24 contained in the current data record into the electronic document selected in task 80. It should be noted that task 82 may transpose, rather than copy, identifying data 24 into the electronic document. Task 82 preferably transforms the electronic document into the desired jurisdiction-specific form document 26. In the preferred embodiment, form documents 26 are physically generated in a batch format (described below) rather than individually as produced during form generation process 60. Alternatively, as described above, system 10 may be configured as a paperless system that electronically transfers form documents 26 following process 60.

Following task 82, a task 84 is performed to calculate any applicable fee payment associated with the current form document 26. For example, a particular jurisdiction may require payment of a vehicle registration fee related to the filing of a registration document. The amount of the registration fee may be dependent upon several factors such as the gross vehicle weight, the number of cylinders, the purchase price, the age of the vehicle, or the like. Title, license, and other fees may be based upon similar factors. During the calculation of such fees, task 84 may access the current data record and/or a fee database 86 that includes fee schedules for the various jurisdictions. After task 84, form generation process 60 exits, preferably to task 62 of titlework process 50 (described above).

Figure 7:
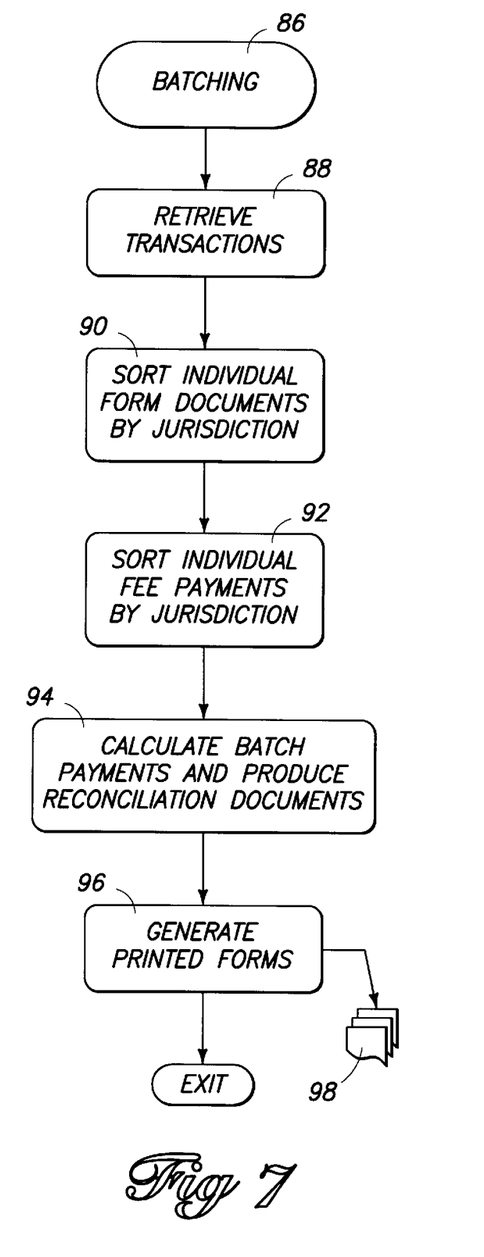
FIG. 7 is a flow diagram of a batching process performed by the titling system.

FIG. 7 is a flow diagram of a batching process 86 performed by system 10. Process 86 is performed to enable system 10 to efficiently process titlework in a number of jurisdictions for a number of vehicles. Process 86 may be performed periodically by system 10, e.g., at the close of each business day.

Batching process 86 begins with a task 88, which retrieves a number of transactions subject to final processing. As described above in connection with titlework process 50, such transactions may contain data records or electronic representations of the corresponding form documents 26. Following task 88, a task 90 sorts the individual form documents 26 by jurisdiction and a task 92 sorts the individual fee payments by jurisdiction.

After tasks 90 and 92, a task 94 calculates a batch fee payment for at least one jurisdiction and produces an associated reconciliation document 28 (see FIG. 1) for each batch fee payment. The batch fee payments are preferably based upon the individual fee payments for the particular jurisdiction. Thus, one lump payment (rather than a large number of individual payments) may be sent to an appropriate state agency 20. In addition, the batch fee payments may be calculated according to specific jurisdictional requirements. For example, a certain jurisdiction may have separate agencies that handle vehicle titles, registrations, licenses, etc. The jurisdiction may require separate payments to the applicable agencies.

In the context of this description, reconciliation documents 28 may be any physical or electronic entity representing a transfer of value. For example, task 94 may print paper checks or initiate an electronic transfer of funds between central office 22 and one or more state agencies 20.

In addition to task 94, a task 96 is performed to generate the various printed forms 98 associated with the retrieved form documents 26. During task 96, a system operator may be prompted to select appropriate blank forms and load the blank forms into a printer (not shown). As a consequence of the jurisdictional sorting performed in task 90, system 10 is capable of sequentially generating a number of jurisdiction-specific form documents 26 associated with a first jurisdiction prior to sequentially generating a number of jurisdiction-specific form documents 26 associated with a second jurisdiction. For example, task 96 may generate all of the title certificates for a given jurisdiction before prompting the system operator to select and load a new supply of blank forms. Following task 96, batching process 86 ends.

The present invention places no limitations on where batching process 86 is conducted. For example, process 86 may be performed at central office 22, at remote workstations 36, or at state agencies 20 (see FIG. 1). The data representing the relevant transactions may be delivered via known telecommunications techniques or by physical transfer of data storage media. Depending upon where process 86 is performed, system 10 may initiate physical or electronic delivery of the titlework and the associated reconciliation documents.

In summary, the present invention provides an improved titling system capable of efficiently processing titlework for a large number of vehicles (or other products or services) subject to different jurisdictional requirements. The titling system includes security measures and document tracking features that are lacking in conventional systems. The titling system is capable of receiving data electronically from a remote source independent of the associated documentation that contains the data. The preferred embodiment automatically selects appropriate jurisdiction-specific documents for titlework processing and batch processes the form documents and fee payments on a jurisdictional basis.

The present invention has been described with reference to a preferred embodiment. However, those skilled in the art will recognize that changes and modifications may be made in the preferred embodiment without departing from the scope of the present invention. For example, the various processes described herein may include more or less tasks according to suitable modifications and the various processes may be incorporated into one or more larger processing environments. In addition, many of the processing tasks described herein need not be performed in any particular order relative to one another. These and other changes and modifications that will be obvious to those skilled in the art are intended to be included within the scope of the present invention, as expressed in the following claims.

What is claimed is:

1. A title transferring method comprising the steps of:
   maintaining a database in a computer system located at a central office, said database containing a plurality of electronic documents configured in accordance with forms utilized by a plurality of jurisdictions;
   receiving data in said computer system, said data identifying an article subject to titling requirements of one of said jurisdictions; and
   transforming one of said electronic documents into a jurisdiction-specific document containing said data, said jurisdiction-specific document being associated with said one of said jurisdictions.

2. A title transferring method according to claim 1, wherein said transforming step includes the step of transposing said data into said one of said electronic documents.

3. A title transferring method according to claim 1, wherein said one of said jurisdictions is indicated by said data.

4. A title transferring method according to claim 3, further comprising the step of prompting a user to provide specific data to said computer system, said specific data being dependent upon said one of said jurisdictions.

5. A title transferring method according to claim 1, wherein said receiving step receives said data from a remote location relative said computer system.

6. A title transferring method according to claim 1, further comprising the step of obtaining, at said central office, an origination document associated with said article.

7. A title transferring method according to claim 6, further comprising the steps of:
   storing, in said computer system, a record containing said data; and
   flagging said record if said obtaining step is not performed within a predetermined time period after said receiving step.

8. A title transferring method according to claim 6, further comprising the step of verifying said data with corresponding data contained in said origination document.

9. A method for transferring titles of a number of articles, said method comprising the steps of:
   maintaining a database in a computer system, said database containing a plurality of electronic documents representing jurisdiction-specific forms associated with a plurality of jurisdictions;
   receiving, at said computer system, first and second data records identifying first and second articles, respectively, said first and second articles being subject to titling requirements of a first jurisdiction;
   identifying, from each of said first and second data records, said first jurisdiction;
   selecting one of said electronic documents in response to said first jurisdiction;
   transforming said one of said electronic documents into a first form document containing data from said first data record; and transforming said one of said electronic documents into a second form document containing data from said second data record.

10. A method according to claim 9, further comprising the step of altering one of said first and second data records, said altering step being performed after said receiving step.

11. A method according to claim 9, wherein said receiving step receives at least one of said first and second data records from a remote location relative said computer system.

12. A method according to claim 9, further comprising the step of obtaining first and second origination documents associated with said first and second articles, respectively.

13. A method according to claim 12, further comprising the step of verifying data contained in said first and second data records with corresponding data contained in said first and second origination documents, respectively.

14. A method according to claim 9, further comprising the steps of:
  determining individual fee payments associated with said first and second form documents;
  calculating a batch fee payment based upon said individual fee payments; and
  producing a reconciliation document for said batch fee payment.

15. A method according to claim 9, further comprising the steps of:
  receiving, at said computer system, a third data record identifying a third article subject to titling requirements of a second jurisdiction;
  identifying, from said third data record, said second jurisdiction;
  selecting one of said electronic documents in response to said second jurisdiction; and
  transforming said one of said electronic documents to generate a third form document containing data from said third data record.

16. A method according to claim 15, further comprising the step of sorting said first, second, and third form documents according to said first and second jurisdictions.

17. A method according to claim 15, further comprising the steps of:
  determining individual fee payments associated with said first, second, and third form documents;
  sorting said individual fee payments according to said first and second jurisdictions; and
  calculating batch fee payments for said first and second jurisdictions, said batch fee payments being based upon said individual fee payments.

18. A system for transferring title for an article subject to jurisdiction-specific titling requirements, said system comprising:
  a central computer comprising:
    a database configured to store a plurality of electronic documents configured in accordance with jurisdiction-specific forms utilized in a plurality of jurisdictions;
    a memory element capable of storing data identifying said article; and
    a processor configured to communicate with said database and with said memory element, said processor being configured to process one of said electronic documents in response to the receipt by said central computer of said data; and
  an output device compatible with said central computer system, said output device being configured to generate a jurisdiction-specific document containing at least a portion of said data, said jurisdiction-specific document being derived from said one of said electronic documents.

19. A system according to claim 18, further comprising a data communication interface configured to receive said data from a remote location relative to said central computer.

20. A system according to claim 19, further comprising a remote workstation at said remote location, said remote workstation being configured to download said data to said central computer system via said data communication interface.

21. A system according to claim 18, wherein said central computer system further comprises at least one workstation in communication with said database, said at least one workstation being configured to access said electronic documents and to provide said data to said memory element.

22. A method for transferring titles for a plurality of articles subject to jurisdiction-specific titling requirements, said method comprising the steps of:
  maintaining a database in a central computer system, said database including a plurality of electronic documents configured in accordance with jurisdiction-specific forms utilized in a plurality of jurisdictions;
  receiving a plurality of data records at said central computer system, each of said data records identifying a different one of said articles;
  processing one of said electronic documents for each of said data records; and
  generating a plurality of jurisdiction-specific documents, each of said jurisdiction-specific documents containing data from an associated one of said data records.

23. A method according to claim 22, further comprising the steps of:
  determining individual fee payments associated with a number of said jurisdiction-specific documents;
  sorting said individual fee payments according to at least one of said jurisdictions; and
  calculating a batch fee payment for said at least one of said jurisdictions, said batch fee payment being based upon said individual fee payments.

24. A method according to claim 22, further comprising the step of sorting said jurisdiction-specific documents according to at least first and second jurisdictions.

25. A method according to claim 24, wherein said generating step sequentially generates a number of said jurisdiction-specific documents associated with said first jurisdiction prior to sequentially generating a number of said jurisdiction-specific documents associated with said second jurisdiction.

26. A method according to claim 22, wherein said receiving step receives said data records from at least one remote location relative said central computer system.

* * * * *